W. J. LEONARD.
CONVERTIBLE VEHICLE BODY.
APPLICATION FILED SEPT. 27, 1916.

1,283,230.

Patented Oct. 29, 1918.
2 SHEETS—SHEET 1.

Inventor
William J. Leonard
By his Attorney
Philip B. Keck

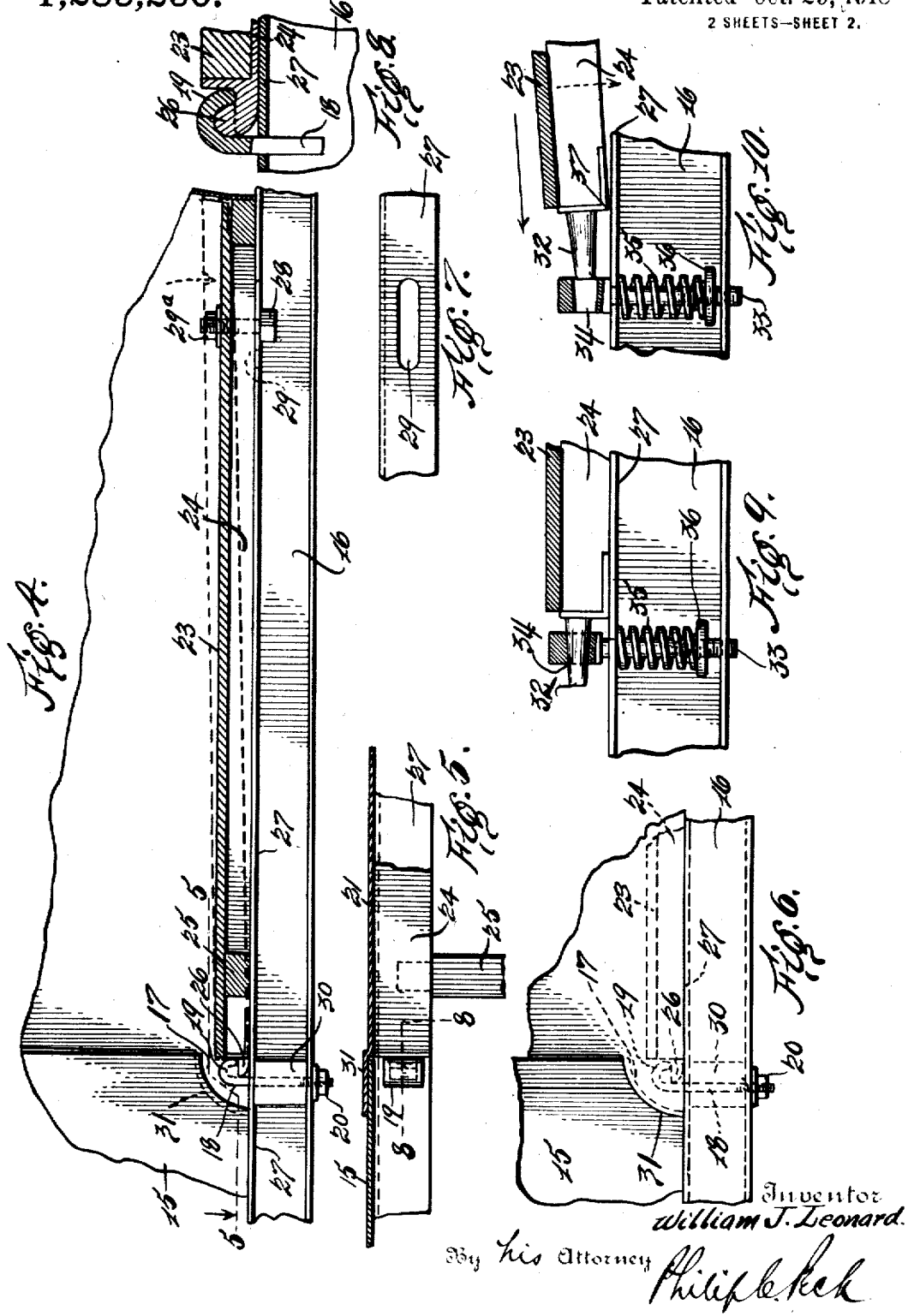

UNITED STATES PATENT OFFICE.

WILLIAM J. LEONARD, OF NEW YORK, N. Y.

CONVERTIBLE VEHICLE-BODY.

1,283,230.   Specification of Letters Patent.   Patented Oct. 29, 1918.

Application filed September 27, 1916. Serial No. 122,329.

*To all whom it may concern:*

Be it known that I, WILLIAM J. LEONARD, a citizen of the United States, and a resident of the borough of and county of Bronx, in the city and State of New York, have invented certain new and useful Improvements in Convertible Vehicle-Bodies, of which the following is a specification, reference being made to the accompanying drawings, forming a part thereof.

My invention relates primarily to convertible bodies for vehicles, but has particular reference to improvements in such bodies for automobiles.

The objects of my invention, among other things, are to provide an interchangeable body construction, the separate parts of which may be easily and quickly changed and locked into position, such separate body portions being built for automobiles so that they may be removably, or detachably, secured upon the chassis or frame. I accomplish these objects by providing separate rear body portions, commonly constructed for a roadster body, a touring, or five passenger car body, or a delivery, or commercial, body, which rear body portions may be firmly and rigidly secured to the forward part of the body proper and to the chassis. These rear body portions may be readily removed from position, and a different rear body portion substituted upon the chassis when desired. Hence I am enabled by my improved structure to interchangeably utilize, or combine with, a single chassis and forward fixed body portion either a roadster body, a touring car body, or, in fact, any style, or type, of body, or tonneau.

A further object is to provide a convertible vehicle body in which the parts comprising same shall be capable of being securely locked together when in position and in use, and further will require comparatively small movement to effect such locking and unlocking from the main fixed portion of the automobile body.

My invention also extends to the means whereby the detachable body portions are rigidly held in position in the chassis, or frame.

With the above and other objects in view, the invention consists in the novel construction, combination and arrangement of parts as will be hereinafter more fully described and particularly pointed out in the appended claims.

Figure 1:
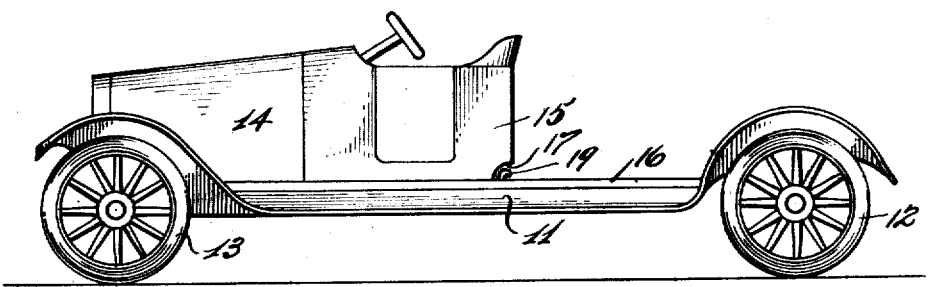
Figure 2:
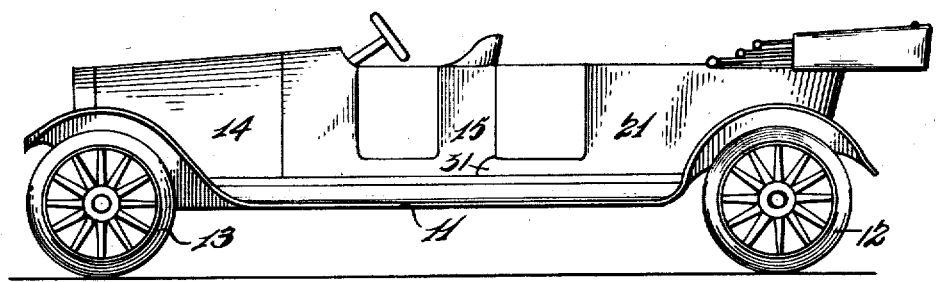
Figure 3:
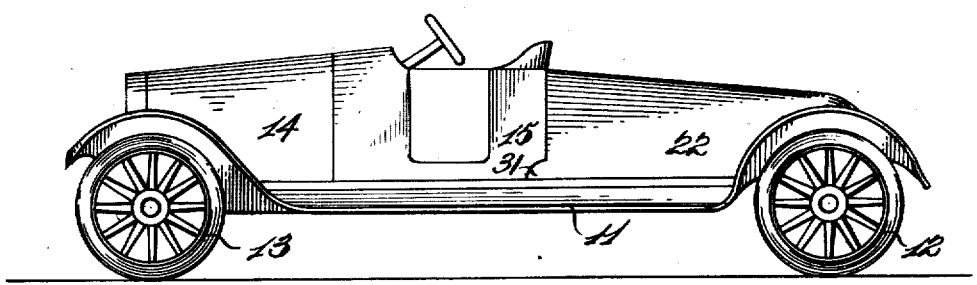

In the accompanying drawings, Figure 1 is a side elevation of the chassis of an automobile provided with a fixed front seat and motor housing, the rear portion of the chassis being arranged to receive a body to convert the skeleton into a touring car, roadster, or other form of vehicle; Fig. 2 illustrates the skeleton of a car converted into a touring car; Fig. 3 illustrates the skeleton of a car converted into a roadster; Fig. 4 is an enlarged sectional view, partly in elevation, illustrating a means for connecting a rear body portion to the chassis of the skeleton of a car to convert same into different types; Fig. 5 is a fragmentary sectional plan view, the section being taken on the line 5—5 shown in Fig. 4; Fig. 6 is a fragmentary side elevation illustrating a portion of a detachable rear body portion and a portion of the fixed front seat; Fig. 7 is a fragmentary top plan view illustrating one of the oblong openings formed in the frame of the chassis to receive the holding-down bolts for the back portion of the detachable rear body members: Fig. 8 is an enlarged sectional view, the section being taken on the line 8—8 shown in Fig. 5; Fig. 9 is a fragmentary side elevation, partly in section, illustrating an alternate form of means to secure the forward end of the detachable rear body member to the chassis; and Fig. 10 is a fragmentary side elevation, partly in section, of the parts shown in Fig. 9, illustrating such parts before they are secured in position as shown in Fig. 9.

Similar numbers refer to similar parts throughout the several figures.

Referring to the drawings, 11 indicates the truck frame, or chassis, of an automobile, the same being mounted by the usual springs on the front and rear axles on which are the driving wheels 12, and steering wheels 13. 14 designates the motor housing and 15 the front seat, both being permanently affixed to the chassis 11. The chassis 11 has the usual side members 16 (only one being shown) extending lengthwise of the automobile between the two sets of driving wheels 12 and steering wheels 13.

The lower rear portion of the front seat 15, adjacent the side members 16, has cut-out portions 17 formed on each side, as shown in Figs. 1, 4, and 6. Extending upwardly through the side members 16 are two binding bolts 18, having their upper ends bent backward in the form of hooks 19, as shown in Figs. 4 and 6. The lower ends of the bolts 18 are screw-threaded so as to be engaged by the nuts 20. The hooks 19 are sufficiently elevated above the top web of the side members 16, and when the nuts 20 are screwed down, the hooks 19 are lowered so as to approach the top web of such side members.

In Fig. 2, I have shown a detachable touring car body 21, and in Fig. 3, a detachable roadster body 22, and other types or styles, of bodies may be employed upon a single chassis, without departing from my invention, these bodies 21 and 22 being shown to illustrate one of the features of my invention. The bodies 21 and 22 are built of substantially the same size and shape along their bases, and are adapted to be removably secured to the chassis 11, from which either may be removed, and the other substituted, as convenience requires.

These bodies 21 and 22 comprise two floor members 23 and two sills 24 (only one being shown) extending in substantial parallelism with the side members 16 and superimposed above them as shown in Fig. 4. The forward portions of the floor members 23 and sills 24 are connected by the cross brace 25, as shown in Figs. 4 and 5. Rigidly secured to the front ends of the floor members 23 and sills 24 are two toe members 26 (only one being shown in Figs. 4, 5 and 6), adapted to engage beneath the hooks 19, when the bodies 21 or 22 are lifted on the chassis 11, and pushed forwardly into such engagement. To secure a firm and tight hold on the hooks 19, I have constructed the floor members 23 and sills 24 so that a slight leverage action is produced by having the sills 24 bear upon the top web 27 of the side-members 16, just back of the toe members 26, as shown in dotted lines in Fig. 4. Near the opposite ends of the floor members 23 and sills 24, on both sides of the automobile, are the screw-threaded rear binding bolts 28 (only one being shown) which extend upwardly through elongated slots 29 cut in the top web 27 to allow for adjustment, as shown in Figs. 4 and 7. When the body 21, or the body 22, has been adjusted to the chassis 11, and the toe members 26 engage the hooks 19, as shown in Fig. 8, the detachable bodies with their floors 23 and sills 24 are pressed downwardly as shown by the dotted arrow in Fig. 4, until the sills 24 engage and are in substantial parallelism with the top webs 27, when the bolts 28 are inserted through appropriate holes formed in the floor members 23 and sills 24, and the nuts 29ª screwed down tightly on such bolts. Meanwhile the nuts 20 are screwed tight on the lower ends of the bolts 18, extending through the chassis 11.

30 indicates filling blocks extending between the top and lower webs of the chassis 11, through which the bolts 18 pass, as shown in Figs. 5 and 6. These blocks 30 serve to prevent the webs of the chassis 11 from buckling where they bear the strain of the leverage action of the detachable rear body portions when locked in position by the rear binding bolts 28. 31 indicates an overlap attached on either side to the rear bodies 21 or 22 to cover the cut-out portion 17 so as to preserve the contour and appearance of the automobile body as a whole, when the detachable rear body 21, or 22 is secured in place.

In Figs. 9 and 10, I have shown an alternate form of means for removably securing the front ends of the detachable rear bodies 21 or 22. Mounted on the forward ends of the floor members 23 and sills 24 are two projecting lugs 32, tapered outwardly as shown; extending upwardly through the webs of the chassis 11 are the eye-bolts 33, having the eyes 34 extending lengthwise of the frame as shown. The coil springs 35 encircle the bolts 33 between the webs of the chassis, the upper end of the spring 35 bearing against the under surface of the top web 27, and the lower end engaging the rigid washer 36, as shown. The springs 35 normally hold the eye-bolts 33 in their lower position shown in Fig. 10; when the detachable rear body 21 or 22 is moved forwardly as indicated in Fig. 10 by the arrow in full lines, the lugs 32 engage the eyes 34 of the bolts 33, the forward ends of the sills 24 bearing on the webs 27 at 37. When the sills 24 are brought to horizontal position along the chassis 11 and the parts are secured by the bolts 28, the eye-bolts 33 are raised slightly by the leverage action hereinbefore described, as shown in Fig. 9, against the action of the springs 35. This secures a tight fit for the forward ends of the bodies 21 or 22.

To loosen and lift off the detachable rear bodies 21 or 22, the binding bolts 28 are taken out from the slots 29 and the rear ends of the bodies 21 or 22 are raised slightly, which movement would release either the toe members 26 or the lugs 32 from engagement with the hooks 19 or eye-bolts 33 respectively. These rear bodies may then be wholly removed from the chassis 11, as shown in Fig. 1, and a different style of rear body substituted and locked in position, which could be done in a few minutes.

By utilizing my improvement, an automobile owner may have a single chassis, motor and front seat equipment, and a number of different detachable rear bodies, all arranged to fit the single chassis, and by interchanging the rear bodies, produce a variety of types of motor vehicles. It will be observed that I have provided a convertible vehicle body of exceedingly simple construction which may be readily and quickly changed and adjusted into position, without destroying the outward appearance and contour of the automobile body as a whole.

It will be understood that various modifications of the invention may be made without departing from the principle disclosed in the constructions herein shown and described.

I claim as my invention:

1. A convertible vehicle body comprising a forward body portion affixed to the chassis, a detachable rear body portion adapted to fit the forward body and chassis to complete the vehicle body, means for securing the rear ends of the rear body in contact with the chassis, and means on the forward end of said rear body fulcrumed on, and coacting with, said chassis whereby said rear body and chassis are held in spring-locking engagement when said rear body securing means are locked in position.

2. A convertible vehicle body comprising a forward body portion affixed to the chassis, a detachable rear body portion adapted to fit the forward body and chassis to complete the vehicle body, means for locking the rear body to the chassis to hold said rear body and chassis in mutual parallelism, and means on the forward end of said rear body fulcrumed on, and coacting with, said chassis whereby said rear body and chassis are held in spring-locking engagement when said rear body securing means are locked in position.

3. A convertible vehicle body comprising a forward body portion affixed to the chassis, a detachable rear body portion adapted to fit the forward body and chassis to complete the vehicle body, means for securing the rear ends of the rear body in contact with the chassis, and means on the forward end of said rear body fulcrumed on, and coacting with, said chassis whereby said rear body and chassis are held in spring-locking engagement at their forward ends, when said rear body securing means are locked in position.

4. A convertible vehicle body comprising a forward body portion affixed to the chassis, a detachable rear body portion adapted to fit the forward body and chassis to complete the vehicle body, means for locking the rear body to the chassis to hold said rear body and chassis in mutual parallelism, and means on the forward end of said rear body fulcrumed on, and coacting with, said chassis whereby said rear body and chassis are held in spring-locking engagement at their forward ends, when said rear body securing means are locked in position.

5. A convertible vehicle body comprising a forward body portion affixed to the chassis, a detachable rear body portion adapted to fit the forward body and chassis, spring-actuated means for yieldingly holding in spring-locking engagement the forward ends of said rear-body portion to the chassis, and means for securing the rear ends of the rear body to the chassis when the rear body is moved forwardly to fit the forward body and chassis.

6. A convertible vehicle body comprising a forward body portion affixed to the chassis, a detachable rear body portion adapted to fit the forward body and chassis, spring-actuated means for yieldingly holding in spring-locking engagement the forward ends of said rear-body portion to the chassis when the rear body is moved forwardly to fit the forward body and chassis and means for locking the rear body to the chassis to hold said rear body and chassis in mutual parallelism.

7. A convertible vehicle body comprising a forward body portion affixed to the chassis, a detachable rear body portion adapted to fit the forward body and chassis, resilient means for removably securing in spring-locking engagement the forward ends of said rear body portion to the chassis, and means for rigidly securing the rear ends of the rear body to the chassis when the rear body is moved forwardly to fit the forward body and chassis.

8. A convertible vehicle body comprising a forward body portion affixed to the chassis, a detachable rear body portion adapted to fit the forward body and chassis, resilient means for removably securing in spring-locking engagement the forward ends of said rear body portion to the chassis, and means for rigidly locking the rear body to the chassis to hold said rear body and chassis in mutual parallelism.

9. A convertible vehicle body comprising a forward body portion affixed to the chassis, a detachable rear body portion having projecting lugs at its forward ends and adapted to fit the forward body and chassis, resilient means for yieldingly and removably securing in spring-locking engagement said projecting lugs on the rear body when the lugs are moved forwardly to coact with said resilient means, and means for locking said rear body in mutual parallelism with said chassis.

WILLIAM J. LEONARD.

Witnesses:
PHILIP C. PECK,
WILLIAM J. HOPKINS.